(12) United States Patent
Sun et al.

(10) Patent No.: US 8,170,575 B2
(45) Date of Patent: May 1, 2012

(54) METHOD AND A DEVICE IN A WIRELESS COMMUNICATION SYSTEM

(75) Inventors: Ying Sun, Sundbyberg (SE); Girum Fantaye, Kista (SE); Christian Skärby, Stockholm (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 13/058,661

(22) PCT Filed: Aug. 12, 2008

(86) PCT No.: PCT/SE2008/050916
§ 371 (c)(1),
(2), (4) Date: Feb. 11, 2011

(87) PCT Pub. No.: WO2010/019080
PCT Pub. Date: Feb. 18, 2010

(65) Prior Publication Data
US 2011/0143766 A1    Jun. 16, 2011

(51) Int. Cl.
*H04W 72/08* (2009.01)
(52) U.S. Cl. ........................ 455/452.2; 455/522; 370/252
(58) Field of Classification Search .................. 370/252, 370/335; 455/522, 452.2
See application file for complete search history.

(56) References Cited

U.S. PATENT DOCUMENTS

2004/0066754 A1*  4/2004  Hottinen ........................ 370/252
2006/0153060 A1   7/2006  Cho
2008/0081655 A1*  4/2008  Shin et al. ..................... 455/522

FOREIGN PATENT DOCUMENTS
EP   1 569 403 A2   8/2005

OTHER PUBLICATIONS

European Communication Corresponding to Application No. 08 794 141.5-1237; Dated: Oct. 6, 2011; 7 pages.
Notification Concerning Transmittal of International Preliminary Report on Patentability; International Preliminary Report on Patentability and Written Opinion of the International Searching Authority corresponding to International Application No. PCT/SE2008/050916; Date of Mailing: Feb. 24, 2011; 9 pages.
Philips "Control of CQI feedback signalling in E-UTRA" 3GPP TSG RAN WG1 Meeting #48, Tdcoc R1-071093, Feb. 12-16, 2007, pp. 1-3.
International Search Report corresponding to PCT Application No. PCT/SE2008/050916, Date of Mailing: Jun. 5, 2009.

* cited by examiner

*Primary Examiner* — Phuoc Doan
(74) *Attorney, Agent, or Firm* — Myers Bigel Sibley & Sajovec, P.A.

(57) ABSTRACT

In a wireless communication system, a base station adaptively schedule CQI reports form mobile stations. By adaptively prioritizing the CQI report from the mobile station against the uplink traffic and control data, the CQI reporting rate avoids unnecessary overhead in the uplink while maintaining good performance. The CQI reports are requested in response to a calculated weighting factor which is based on channel coherence time that can be estimated by the base station. The adaptivity in the CQI reporting allows achieving an optimal tradeoff between uplink traffic data and downlink control feedback signaling.

21 Claims, 5 Drawing Sheets

METHOD AND A DEVICE IN A WIRELESS COMMUNICATION SYSTEM

CROSS REFERENCE TO RELATED APPLICATION

This application is a 35 U.S.C. §371 national stage application of PCT International Application No. PCT/SE2008/050916, filed on 12 Aug. 2008, the disclosure and content of which is incorporated by reference herein in its entirety. The above-referenced PCT International Application was published in the English language as International Publication No. WO 2010/019080 A1 on 18 Feb. 2010.

TECHNICAL FIELD

The present invention relates to a method and a device in a cellular radio system. More specifically the present invention relates to a method and a device for improved scheduling in a cellular radio system.

BACKGROUND

The work on standardization of the Long Term Evolution (LTE) concept is currently ongoing within the third generation partnership program (3 GPP). In LTE the downlink will support channel dependent scheduling in both the time and frequency domains. The radio base station in the LTE network denoted evolved NodeB (eNodeB) will transmit reference signals that the mobile stations also termed User Equipments (UEs) use to determine the downlink channel quality. The UEs will send Channel Quality Indication (CQI) reports back to the eNodeB that are used by a scheduler located in the eNodeB for scheduling resources within the cell that the eNodeB serves.

In the LTE network the UE is specified to be able to transmit different types of CQI reports. For example the UE will have the capability to transmit a full CQI reports and partial CQI reports. Full CQI report covers the whole downlink transmission bandwidth but they may have different frequency resolution, they may be filtered and processed in different ways, and they may be encoded in different ways, see also 3 GPP TS 36.213 V8.2.0, "Physical layer procedures".

A scheduling function in the eNodeB controls, for each time instant, to which users the shared resources should be assigned. It also determines the data rate to be used for each link, which is also called link adaptation. Both downlink and uplink transmissions are subject to fast scheduling, taking into account the instantaneous traffic pattern and radio propagation characteristics of each UE.

The possibility for channel-dependent scheduling in the frequency domain is particularly useful at low terminal speeds, in other words when the channel characteristic is varying slowly in time. For the downlink, each terminal measures and reports an estimate of the instantaneous channel quality to the eNodeB by sending CQI reports. Based on the channel-quality estimate, the downlink scheduler can assign resources to the users, taking the channel qualities into account. In principle, a scheduled UE can be assigned an arbitrary combination of 180 kHz wide resource blocks in each 1 ms subframe.

Furthermore, CQI reports used together with Single Input Single Output (SISO), Multiple Input Single Output (MISO), Single Input Multiple Output (SIMO), or Multiple Input Multiple Output (MIMO) transmission could also be different for the different transmission cases. To exemplify, for MIMO a CQI report may e.g. include pre-coding weights to be used by the eNodeB multiple antenna transmission scheme.

The LTE uplink is based on single-carrier modulation and uses frequency division multiple access (FDMA) and time division multiple access (TDMA) principles. The LTE uplink consists of physical uplink control channels and data channels that are orthogonally frequency multiplexed. The single-carrier property of the LTE uplink makes it impossible for a UE to transmit on a physical control channel and a physical data channel in the same transmission-time-interval (TTI). Hence if a UE is transmitting data on a physical data channel the CQI that must be sent in the same TTI must also be sent on the physical data channel. When the CQI is transmitted on the physical data channel it is multiplexed with data. When there is no data to transmit on the physical data channel the CQI report is multiplexed with padding bits. The CQI can also be transmitted periodically on the PUCCH and the periodicity is configured through Radio Resource Control (RRC).

The current assumption in 3 GPP regarding the CQI reporting on the physical control channel is that a maximum of approximately 10 bits can be transmitted per UE and TTI This number of bits leaves little space for fine granular CQI frequency domain information and MIMO information. On the physical data channel it will most likely be possible to transmit more bits.

When a UE is scheduled for data transmission on the physical channel it is signaled an uplink grant including resource block allocation and transport format selection. The uplink grant also includes 1 bit which indicates if a CQI report should be included in the uplink transmission or not. The format of this CQI report is Radio Resource Control (RRC) configured.

The transmission of a CQI report is important. The size of the CQI report shall be sufficiently big so that it can represent sufficiently accurate channel quality. It shall be able to transmit with sufficient frequency so that the reported channel quality is not outdated. However, since CQI report consumes resources in the uplink, inefficient CQI reporting will sacrifice uplink transmission capacity and therefore results in reduced capacity in the uplink.

Hence there exist a need for a method and a node that improve the procedure by means of which it is determined when CQI reports are transmitted from the UE.

SUMMARY

A problem with the wireless communication networks is that the predetermined fixed rate of reporting CQIs results in poor capacity usage in the uplink.

A general object of the present invention is to provide improved methods and arrangements for scheduling the CQI reports.

A further object of the present invention is to provide a method for enabling a base station to adaptively schedule the CQI reports from mobile stations.

These and other objects are achieved in accordance with the attached set of claims.

A first embodiment of the present invention provides a method in a base station for obtaining channel quality indication (CQI) reports from a mobile station in a cellular communications system. The mobile station is being connected to the cellular communications system via the base station. The base station which comprises a scheduler, measures a coherence time of a radio communication channel for communication between the base station and the mobile station and calculates a weighting factor for obtaining the CQI reports by using the measured coherence time. In response to the calculated weighting factor the base station requests CQI reports from the mobile station.

Another embodiment of the present invention provides a base station for obtaining channel quality indication, CQI, reports from a mobile station being connected to said base station. The base station comprises a scheduler, a measuring unit, a calculating unit and a control unit. The measuring unit measures a coherence time of a radio communication channel for communication between the base station and the mobile station, while the calculating unit calculates a weighting factor for obtaining the CQI reports by using the measured coherence time. The control unit requests CQI reports from the mobile station in response to the calculated weighting factor.

An advantage of the present invention is that the base station can restrict the measurement bandwidth, i.e. reduce the overhead cost of CQI reporting.

Another advantage of the present invention is to optimize the CQI reporting period with respect to the trade off between uplink overhead and downlink throughput, i.e. avoiding unnecessary overhead in the uplink while maintaining good downlink performance.

The present invention can naturally be applied in other cases of scheduling a reverse channel feedback control signaling if the maximum waiting time to schedule the feedback control signaling can be estimated.

Yet another advantage of the present invention is that in the case where the resources for channel feedback are dedicated, it effectively minimizes the amount of reporting which in turn means less battery consumption and interference.

DETAILED DESCRIPTION

In the following description, for purposes of explanation and non-limitation, specific details are set forth, such as particular nodes, functional entities, techniques, protocols, standards, etc. in order to provide an understanding of the described technology. It will be apparent to one skilled in the art that other embodiments may be practiced apart from the specific details disclosed below. The technology is described in the context of a Long Term Evolution (LTE) of UMTS in order to provide an example and a non-limiting context for explanation. The ideas of the present invention are equally applicable to many types of cellular systems consisting of a plurality of base stations, where CQI reporting is necessary.

In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs).

Generally, the present invention is applicable to various communications system. Universal Mobile Telecommunications System (UMTS) is one of the third-generation (3 G) mobile phone technologies. Currently, the most common form uses W-CDMA as the underlying air interface, is standardized by the 3rd Generation Partnership Project (3 GPP), and is the European answer to the ITU IMT-2000 requirements for 3 G cellular radio systems. The Long Term Evolution (LTE) of UMTS is under discussion by the 3 GPP which standardized UMTS. The objective of the LTE work is to develop a framework for the evolution of the 3 GPP radio-access technology towards a high-data-rate, low-latency and packet-optimized radio-access technology. So the focus is on supporting services provided from the packet switched (PS)-domain. LTE is explained as one example of the various communication systems, to which the present invention is applicable, in the following description.

Figure 1:
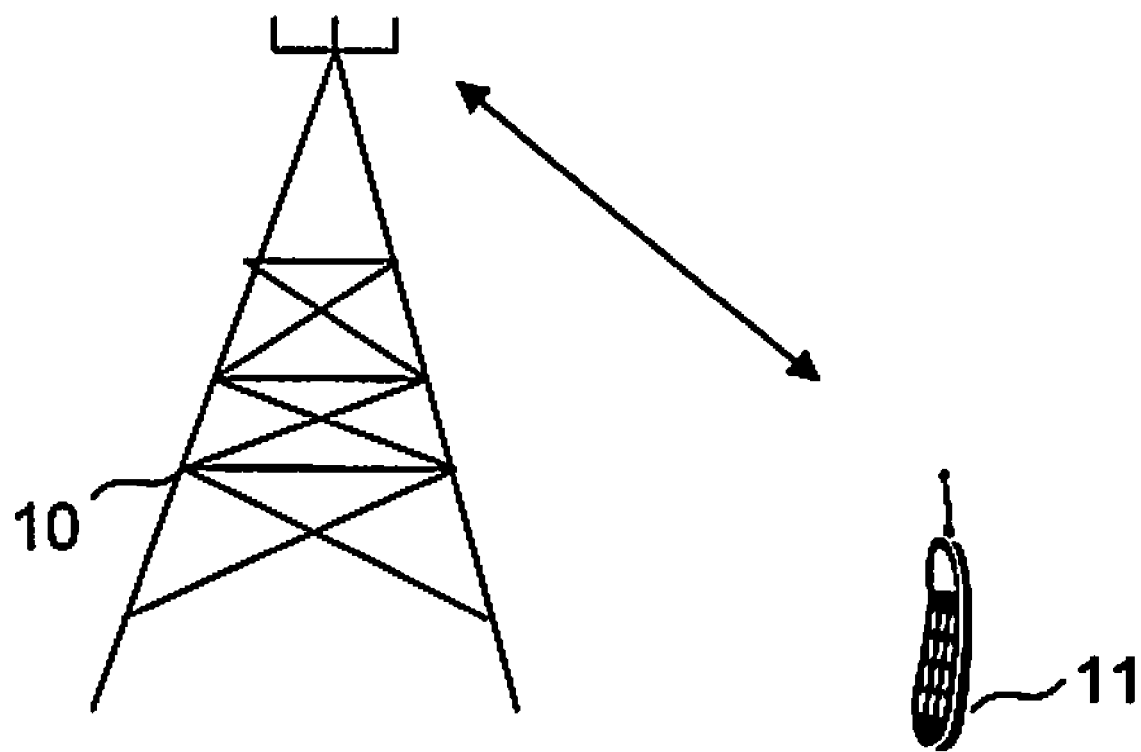
FIG. 1 is a schematic view of a cellular communications network.

FIG. 1 illustrates a conventional downlink scheduling concept. A base station 10, which is referred to as an enhanced NodeB, or eNodeB in LTE, communicating with a user equipment (UE) 11, transmits reference signals to UE 11. The reference signals can be used by the UE 11 to determine the present downlink channel quality. After having determined the downlink channel quality on the basis of the received reference signals, the UE 11 sends one or more channel state feedback reports, which in this context typically represented by channel Quality indication (CQI) reports, back to the eNodeB 10. In eNodeB 10, the content of the one or more CQI reports can be retrieved and used by the scheduler (not shown), to perform resource allocation. The UE 11 is informed of the resource allocation, which is followed by transmission of uplink data over the allocated resource.

The overhead of CQI reporting can be controlled by choosing an appropriate quantization of the channel quality among different types of reporting: wideband or Multi-band frequency granularity, non-MIMO or MIMO antenna schemes. The transmission of a CQI report is also specified in 3 GPP TS 36.213, Evolved Universal terrestrial radio Access E-UTRAN, Physical layer procedures (release 8). The CQI report can be transmitted by using the reserved resource in the Physical UL Control Channel (PUCCH) or it can be time multiplexed with data on a scheduled resource on the Physical UL Shared Channel (PUSCH). The reporting in the PUCCH is configured by RRC signaling and is periodic, while the reporting in the PUSCH can be granted aperiodically by setting an indication bit in the uplink grant. Different formats can be used depending on if the CQIs are transmitted on the PUSCH or on the PUCCH. By this way, eNodeB can restrict the measurement bandwidth as well as reduce the overhead cost of CQI reporting.

In a wireless communication system, the radio channel changes at different rates depending on the speed of the UE as well as the environment surrounding the transmitter and receiver. The rate at which updates of CQIs are needed for effective scheduling and link adaptation in the base station is therefore related to the changing rate of the channel. As a result, a fixed CQI reporting interval will not give an optimum overall system performance. A too low reporting rate reduces the reporting overhead but may degrade the downlink performance in a fast varying radio condition. On the other hand, a too high reporting rate may give adequate downlink performance but only at a cost of uplink capacity due to a large CQI overhead. The size of the CQI report must be sufficiently big so that it can represent sufficiently accurate channel quality and must be transmitted with sufficient frequency so that the reported channel quality is not outdated. However, since each report consumes resources in uplink, inefficient CQI will sacrifice uplink transmission and consequently results in poor capacity in uplink. Therefore there is a need to adaptively schedule the CQI reporting in the uplink together with the uplink traffic transmission.

In order to perform the scheduling, the scheduler in the eNodeB 10 requires input of what type of data the scheduling candidates (i.e. UE) have in their queues and how to prioritize that data against other types of data. The scheduling candidates can often have one or more different types of traffic to transmit, which can be defined as different traffic classes. The scheduler needs to take this into account to fulfill the traffic requirements.

The goal of the scheduler is to assign transmission resources to the selected scheduling candidate user, UE, so that the system performance is optimized, e.g. cell throughput while ensuring per user based end-to-end performance. A straightforward way to do this is to assign a weight to each UE and let the scheduler assign resources to the UE which has the heaviest weight. For simplicity, an algorithm based on user data priority level is described as in Equation 1. The algorithm is not limited to a certain access technology, nor to uplink or downlink scheduler.

$$U = \underset{u}{\operatorname{argmax}}(W_u), u = 0 \ldots m-1, \quad \text{(Equation 1)}$$

Where u is the scheduling candidate identity and may have the following values 0 ... m−1 where m is the number of scheduling candidates.

$W_u$ is the priority level (i.e. weighting factor) of user u and represents the importance of this user. Hence, the scheduler chooses the user (U) that has the maximum weight (highest priority level) to schedule. $W_u$ is a function of a weighting factor $W_u$(q) of the data in different queue q of the user u and most often it is the maximum value according to equation 2.

$$W_u = \max(W_u(1), W_u(2), \ldots W_u(q) \ldots W_u(Q)) \quad \text{(Equation 2)}$$

Different queues in the UE are used for different Quality of Service (QoS) traffic classes. The weighting factor $W_u$(q) of the queue represents the importance and urgency of the packets in the queue to be scheduled or the absolute scheduling priority of the queue. If there is no data in queue q, $W_u$(q)=0.

Figure 2:
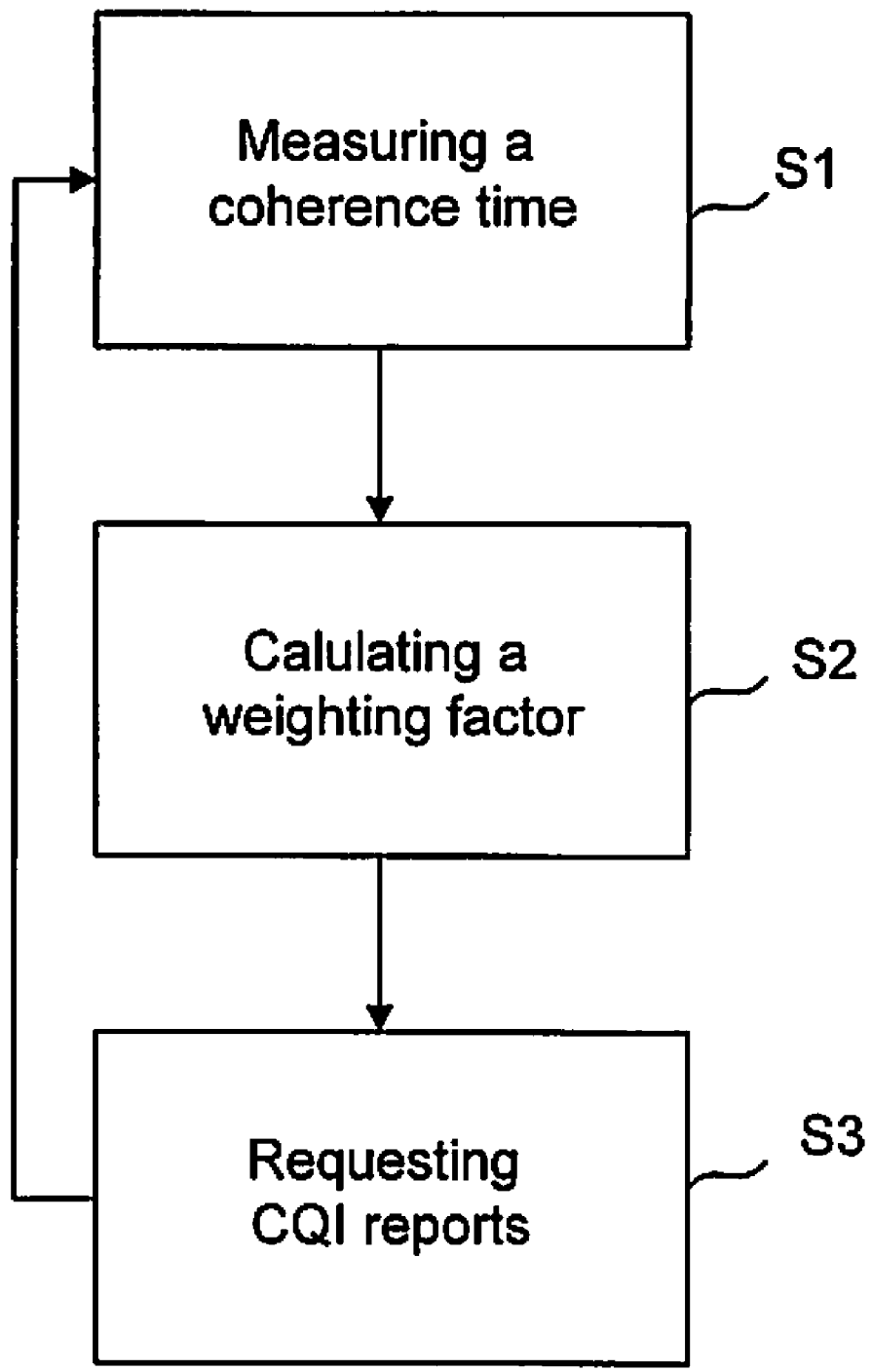
FIG. 2 is a flow diagram according to one embodiment of the invention.

FIG. 2 is a schematic flow diagram that illustrates an example, non-limiting procedures for obtaining channel quality indication, CQI, from a UE according to one embodiment of the invention. At step S1 the eNodeB 10 measures the channel coherence time ($t_{ch\_coh,u}$) of the communication channel being set up between the eNodeB and the UE. The coherence time is a measure of the minimum time required for the magnitude change of the channel to become decorrelated from its previous value. At step S2 the eNodeB 10 calculate a weighting factor ($W_u$ (CQIreport)) for obtaining the CQI reports. The weighting factor ($W_u$ (CQIreport)) is calculated according to:

if $t_{cqi,u} \leq t_{cqimin,u}$
  $W_u$(CQIreport) = 0
else
if $t_{cqi,u} \leq t_{cqimax,u}$
  $W_u(\text{CQIreport}) = \dfrac{t_{cqi,u}}{t_{cqimax,u}} W_{cqimax}$
else
  $W_u$(CQIreport) = $W_{cqimax}$ Where $t_{cqi,u}$ is the elapsed time since last CQI report is scheduled, $t_{cqi\_min,u}$ is a lower threshold to prevent excessive reporting and it can be set as $t_{cqi\_min,u} = k \cdot t_{cqi\_max,u}$, 0<k<1 for simplicity.

$t_{cqi\_max,u}$ is the maximum period that the CQI report can wait to be scheduled without degrading the downlink performance and it can be estimated by:

$$t_{cqi\_max,u} = t_{ch\_coh,u} - t_{sch,delay} - \Delta$$

Where $t_{sch,delay}$ is the delay introduced by scheduling. It is typically a known deterministic value. However a negative value of $t_{cqi\_max,u}$ indicates that the channel coherence time is less than the scheduling delay in which case there is no point in scheduling CQI reports.

$t_{ch\_coh,u}$ is the estimated channel coherence time. The channel coherence time estimation can be done by the base station on physical layer before starting scheduling of CQI report. The actual value of $t_{ch\_coh,u}$ depends for example on speed of the UE and radio environments. Δ is a margin added to ensure that within the period of $t_{cqi\_max,u}$, the channel does not changed much. $W_{cqi\_max}$ is the maximum weighting factor specified for CQI reporting.

AT step S3 the eNodeB request CQI reports from the UE in response to the calculated weighting factor ($W_u$(CQIreport)). However, If the UE is scheduled, a CQI report shall be requested if $W_u$(CQIreport)>0, regardless of whether $W_u$(CQIreport) is the heaviest weight or not for this UE.

The data queues in the UE can be used for different logical channel. An example of logical channels in the uplink can be used for the Dedicated Traffic Channel (DTCH) or for the Dedicated Control Channel (DCCH). The weighting factor ($W_u$) for the UE can be determined as follows:

$$W_u = \max(W_u(\text{DTCH}_i), W_u(\text{DCCH}_j), W_u(\text{CQIreport}))$$

Figure 3:
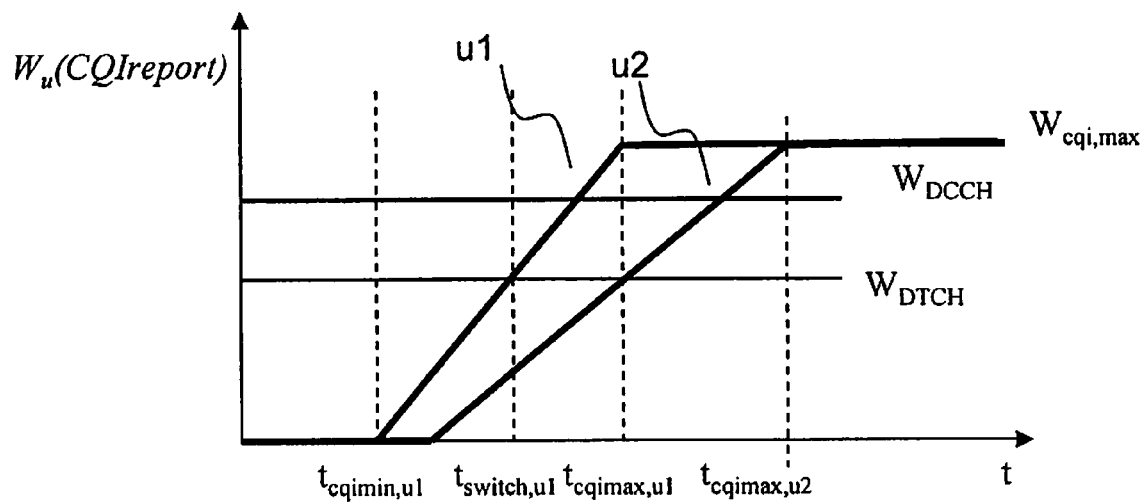
FIG. 3 is graph illustrating CQI report scheduling for two UEs

FIG. 3 illustrates a graph of CQI report scheduling for two UEs (u1 and u2), where the weight factor $W_u$(CQIreport) is linearly increasing as a factor of time. Typically $W_{cqi\_max}$ can be set higher than $W_{DTCH}$, while the exact value relative to other type of logical channels can be tunable to get desired system behavior. In one example $W_{cqi\_max}$, $W_{DTCH}$, and $W_{DCCH}$ are set to have constant values for both UEs (u1 and u2), this is the case where u1 and u2 belongs as for example to same user group.

The maximum period that an eNodeB can wait for scheduling is different for different UEs (u1 and u2), depending on the channel coherence time of each UE. When the $t_{cqimax,u}$ is reached, the weighting factor of CQI report $W_u$(CQIreport) is equal to $W_{cqi,max}$. The actual value of $W_{cqi,max}$ shall be adjustable so that the optimal tradeoff between uplink traffic data and downlink control feedback signaling is reached. When the weighting time to schedule CQI report is shorter than $t_{cqimin,u}$, the priority level of CQI report is 0. That means for a UE, in a certain period of time, there is no need to transmit any CQI report. The $W_u$(CQIreport) is increasing for example linearly while the waiting time is increasing, until the waiting time reaches the maximum tolerant time, $t_{cqimax,u}$, the weight $W_u$(CQIreport) is equal to the maximum value, $W_{cqi\_max}$. As $W_{cqi\_max}$ is greater than the uplink traffic priority level, the tradeoff between CQI report and the uplink traffic and control data transmission is able to be controlled and reached. For example, at time instance $t_{switch,u1}$, the uplink scheduler prioritizes CQI report over DTCH.

Figure 4:
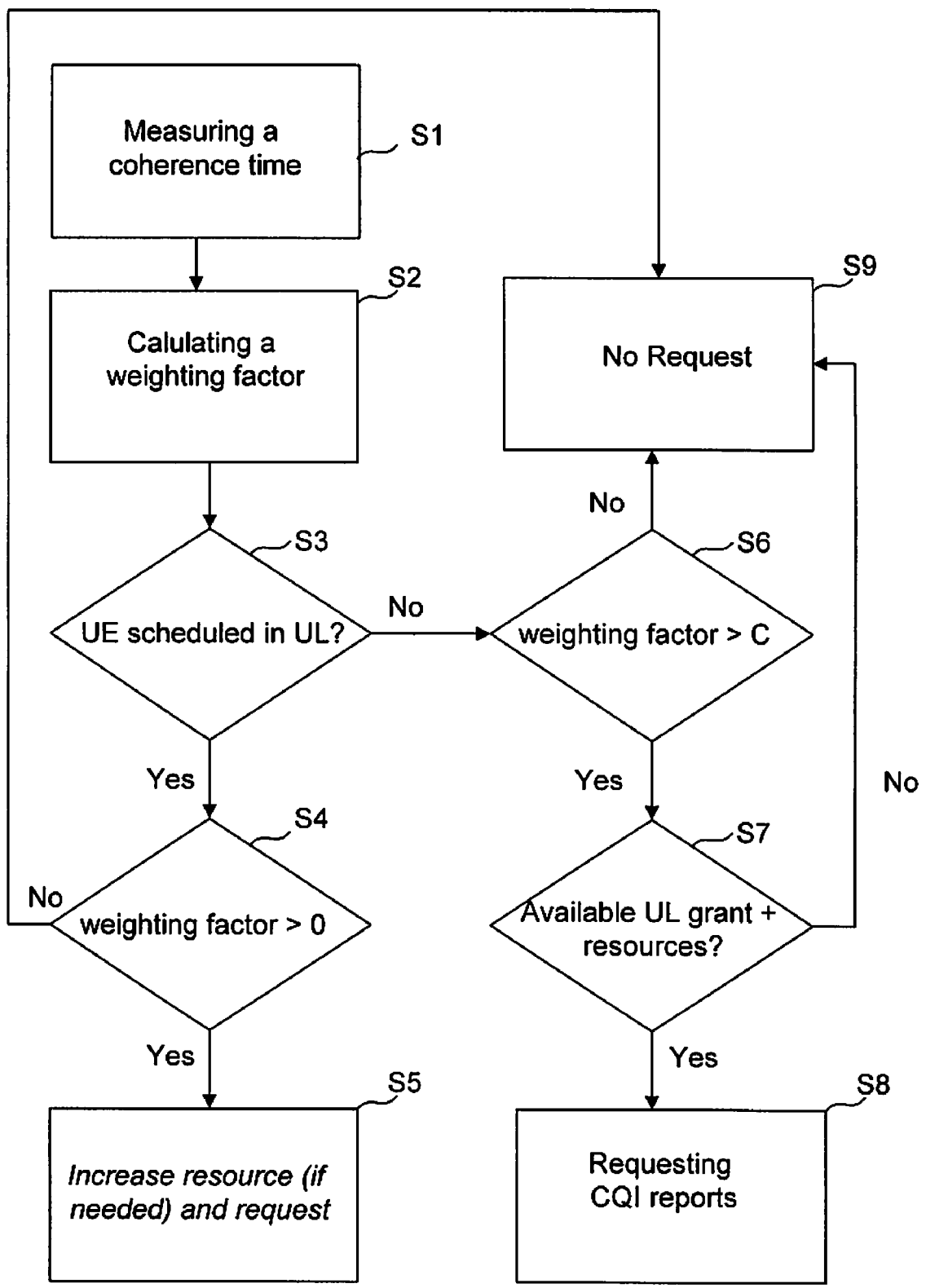
FIG. 4 is a flow diagram according to another embodiment of the invention.

FIG. 4 is a schematic flow diagram that illustrates an example, non-limiting procedures for obtaining channel quality indication, CQI, from a UE according to another embodiment of the invention. At step S1 the eNodeB 10 measures the channel coherence time ($t_{ch\_coh,u}$) of the communication channel being set up between the eNodeB and the UE. Next, in a step S2, the eNodeB 10 calculates a weighting factor ($W_u$ (CQIreport)) for obtaining the CQI reports. The calculation of the weighting factor ($W_u$(CQIreport)) is performed in the same way as described in the context of the first embodiment. If the UE is already scheduled in the uplink S3 the procedure continues to step S4 where it is checked whether the weighting factor is above zero ($W_u$ (CQIreport)>0). If the weighting factor is above zero the eNodeB 10 in step S5 increases the resources if needed and request a CQI report. However, if the weighting factor is not above zero no request is transmitted to the UE 11.

If the UE is not scheduled the procedure continues to step S6 where it is determined by the eNodeB 11 whether the weighting factor ($W_u$(CQIreport)) is above a threshold value C. If the weighting factor is not above threshold value C, no request is transmitted to the UE S9. But if the weighting factor is above threshold value C ($W_u$(CQIreport)>C), the eNodeB 10 checks in step S7 whether there are resources and an uplink grant available. If in step S7 it is determined by the eNodeB 10 that there is no uplink grant available or there are no resources available, the procedure continues to step S9 where no request for CQI report is transmitted to the UE 11. If in step S7, it is determined by the eNodeB 10 that there is uplink grant available and there are also resources available, the procedure continues to step S8 where a request for CQI report is transmitted to the UE 11.

Figure 5:
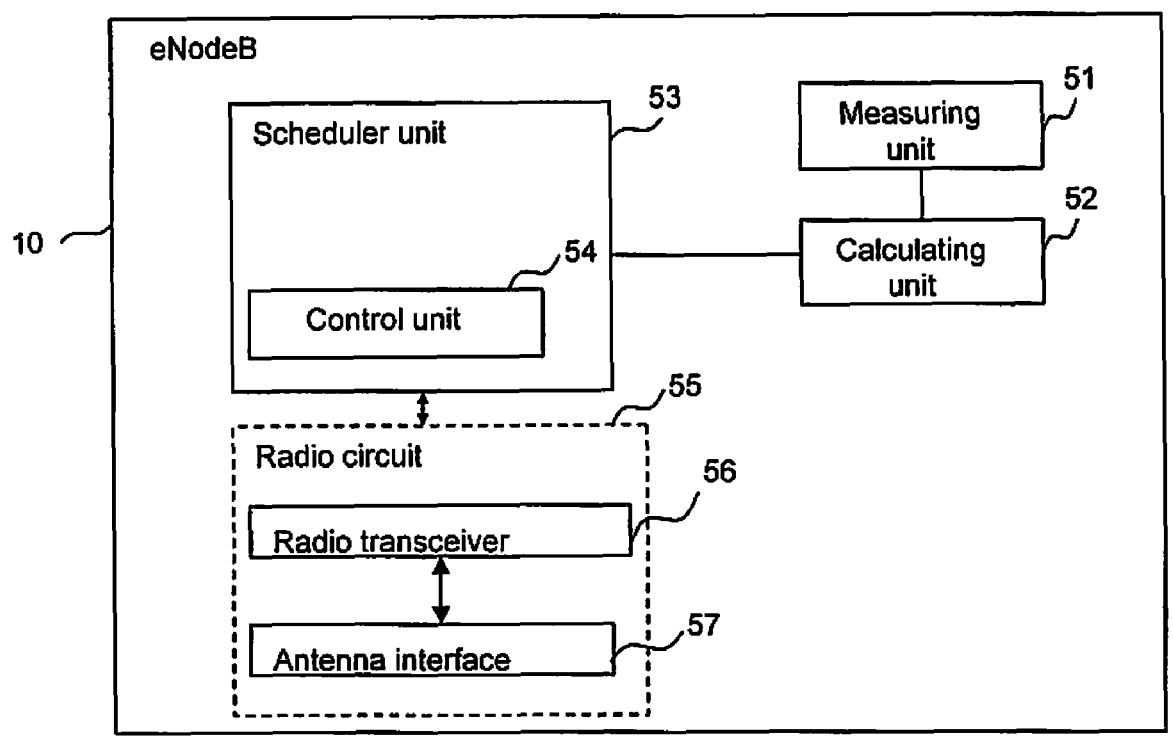
FIG. 5 is a function block diagram of a non-limiting example of base station according to the invention.

FIG. 5 is a function block diagram of a non-limiting example of an eNodeB 10 adapted to request CQI reports, for example, with the procedures described above. The eNodeB 10 includes a measuring unit 51, a calculating unit 52, and scheduler unit 53, and a radio circuit 55 having a radio transceiver 56 coupled to an antenna interface 57. The scheduler 53 includes a control unit 54 which handles the data processing of requesting CQI report from the UE 11. The task of the scheduler 53 is to assign resources to the selected scheduling candidate user U, so that the system performance is optimized, e.g. cell throughput while ensuring per user based end-to-end performance. A straightforward way to do this is to assign a weight to each user and let the scheduler assign resources to the user U which have the heaviest weight. The radio transceiver 56 performs the baseband processing, filtering, frequency translation, amplification, and other operations necessary for radio communication.

The measuring unit 51 measures the coherence time of a radio communication channel being set up for communication between the eNodeB 10 and the UE 11. The calculating unit calculates the weighting factor ($W_u$(CQIreport)) in accordance with the procedures described above. The measuring unit 51 and the calculating unit 52 are depicted as separate unit in the eNodeB 10 but can be incorporated within the scheduler unit 53 or within the control unit 54 of the scheduler unit 53. The scheduler unit 53 controls for each time instant, to which UEs the shared resources should be assigned. It also determines the data rate to be used for each link, which is also called link adaptation. Both downlink and uplink transmissions are subject to fast scheduling, taking into account the instantaneous traffic pattern and radio propagation characteristics of each UE. The control unit 54 requests CQI reports from the UE 11 in response to the calculated weighting factor ($W_u$(CQIreport) of the CQI report.

The present invention may be embodied in many different forms and should not be construed as limited to the embodiments set forth herein; rather, these embodiments are provided so that this disclosure will be thorough and complete, and will fully support the enclosed set of claims.

The invention claimed is:

1. A method in a base station comprising a scheduler adapted to obtain channel quality indication, CQI, reports from a mobile station in a cellular communications system, the mobile station being connected to the cellular communications system via the base station, the method comprising:
   measuring a coherence time of a radio communication channel for communication between the base station and the mobile station;
   calculating a weighting factor for obtaining the CQI reports by using the measured coherence time; and
   requesting CQI reports from the mobile station in response to the calculated weighting factor.

2. The method as claimed in claim 1, wherein the step of requesting CQI reports is performed if the calculated weighting factor of the CQI is above a predetermined threshold.

3. The method as claimed in claim 2, wherein the predetermined threshold is one of weighting factors for data queues used for different logical uplink channels.

4. The method as claimed in claim 2, wherein the predetermined threshold is set to a lower value for a mobile station that is already scheduled.

5. The method as claimed in claim 1, wherein
   if the elapsed time, tu, since a CQI report was last scheduled is less than a first threshold, tmin, then the weighting facto, Wu, is set to Wu=0,
   if tu is greater than tmin but less than, or equal to, a second threshold, tmax, Wu is set to tu divided by tmax and multiplied by a maximum weight factor Wumax,
   if tu is greater than tmax, Wu is set to Wumax.

6. The method as claimed in claim 5, wherein tmax is substantially equal to the estimated coherence time.

7. The method as claimed in claim 6, wherein a margin is subtracted from tmax to ensure that the channel has a limited characteristics variation within the time tmax.

8. The method as claimed in claim 5, wherein tmax is substantially equal to the estimated coherence time subtracted with a delay time introduced by the scheduling.

9. The method as claimed in claim 1, wherein the step of requesting CQI reports is performed by generating an uplink grant comprising a transport format indicating said requested CQI reports.

10. The method as claimed in claim 1, further comprising:
    providing said generated uplink grant to the mobile station in order to receive the required amount of CQI on the granted resource.

11. A base station comprising:
    a scheduler adapted to obtain channel quality indication, CQI, reports from a mobile station being connected to said base station:
    a measuring unit adapted to measure a coherence time of a radio communication channel for communication between the base station and the mobile station;
    a calculating unit adapted to calculate a weighting factor for obtaining the CQI reports by using the measured coherence time; and
    a control unit adapted to request CQI reports from the mobile station in response to the calculated weighting factor.

12. The base station as claimed in claim 11, wherein the control unit is further adapted to request CQI reports if the calculated weighting factor of the CQI is above a predetermined threshold.

13. The base station as claimed in claim 12, wherein the predetermined threshold is one of weighting factors for data queues used for different logical uplink channels.

14. The base station as claimed in claim 11, wherein the predetermined threshold is set to a lower value for a mobile station that is already scheduled.

15. The base station as claimed in claim 11 wherein if the elapsed time, tu, since a CQI report was last scheduled is less than a first threshold, tmin, then the weighting facto, Wu, is set to Wu=0,
  if tu is greater than tmin but less than, or equal to, a second threshold, tmax, Wu is set to tu divided by tmax and multiplied by a maximum weight factor Wumax,
  if tu is greater than tmax, Wu is set to Wumax.

16. The base station as claimed in claim 15, wherein tmax is substantially equal to the estimated coherence time.

17. The base station as claimed in claim 16, wherein a margin is subtracted from tmax to ensure that the channel has a limited characteristics variation within the time tmax.

18. The base station as claimed in claim 15, wherein tmax is substantially equal to the estimated coherence time subtracted with a delay time introduced by the scheduling.

19. The base station as claimed in claim 11, wherein the control unit is further adapted to request CQI reports by generating an uplink grant comprising a transport format indicating said requested CQI reports.

20. The base station as claimed in claim 11, further comprising a transmitting unit adapted to transmit said generated uplink grant to the mobile station.

21. The base station as claimed in claim 11, further comprises a receiving unit adapted to receive the required amount of CQI on the granted resource.

* * * * *

UNITED STATES PATENT AND TRADEMARK OFFICE
CERTIFICATE OF CORRECTION

PATENT NO. : 8,170,575 B2  
APPLICATION NO. : 13/058661  
DATED : May 1, 2012  
INVENTOR(S) : Sun et al.

It is certified that error appears in the above-identified patent and that said Letters Patent is hereby corrected as shown below:

On the Face Page, in the Figure, for Tag "S2", in Line 1, delete "Calulating" and insert -- Calculating --, therefor.

In Figure 2, Sheet 2 of 5, for Tag "S2", in Line 1, delete "Calulating" and insert -- Calculating --, therefor.

In Figure 4, Sheet 4 of 5, for Tag "S2", in Line 1, delete "Calulating" and insert -- Calculating --, therefor.

In Column 3, Line 40, delete "UEs" and insert -- UEs; --, therefor.

In Column 6, Line 19, delete "A" and insert -- $\Delta$ --, therefor.

In Column 6, Line 23, delete "AT" and insert -- At --, therefor.

In Column 7, Line 61, delete "($W_u$(CQIreport)" and insert -- ($W_u$(CQIreport)) --, therefor.

In Column 8, Line 27, in Claim 5, delete "facto," and insert -- factor, --, therefor.

In Column 9, Line 4, in Claim 15, delete "11" and insert -- 11, --, therefor.

In Column 9, Line 6, in Claim 15, delete "facto," and insert -- factor, --, therefor.

Signed and Sealed this  
Twelfth Day of February, 2013

Teresa Stanek Rea  
*Acting Director of the United States Patent and Trademark Office*